(12) United States Patent
Kubo (10) Patent No.: US 9,797,117 B2
(45) Date of Patent: Oct. 24, 2017

(54) FLUID PRESSURE CONTROL DEVICE

(71) Applicant: KAYABA INDUSTRY CO., LTD., Tokyo (JP)

(72) Inventor: Syunsuke Kubo, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/763,026

(22) PCT Filed: Dec. 24, 2013

(86) PCT No.: PCT/JP2013/084527
§ 371 (c)(1),
(2) Date: Jul. 23, 2015

(87) PCT Pub. No.: WO2014/115469
PCT Pub. Date: Jul. 31, 2014

(65) Prior Publication Data
US 2015/0369262 A1    Dec. 24, 2015

(30) Foreign Application Priority Data

Jan. 24, 2013  (JP) ................................. 2013-011386

(51) Int. Cl.
*E02F 9/22* (2006.01)
*F15B 13/01* (2006.01)
(Continued)

(52) U.S. Cl.
CPC .......... *E02F 9/2285* (2013.01); *E02F 9/2267* (2013.01); *F15B 11/044* (2013.01);
(Continued)

(58) Field of Classification Search
CPC .................. E02F 9/2285; F15B 11/165; F15B 2211/30525; Y10T 137/86614;
(Continued)

(56) References Cited

U.S. PATENT DOCUMENTS 5,623,967 A * 4/1997 Hayashi .............. F15B 13/0402
137/625.64
5,752,384 A * 5/1998 Schmitt ................... F15B 11/16
60/426

(Continued)

FOREIGN PATENT DOCUMENTS

CN   1143724 A   2/1997
EP   1143151 A1   10/2001
(Continued)

*Primary Examiner* — Atif Chaudry
(74) *Attorney, Agent, or Firm* — Rabin & Berdo, P.C.

(57) ABSTRACT

A fluid pressure control device includes a switching valve configured to operate in conjunction with the control valve by the pilot pressure led through the pilot valve to switch work of the operation check valve. The switching valve includes a pilot chamber to which the pilot pressure is led, a spool that moves in accordance with the pilot pressure of the pilot chamber, a bias member that biases the spool in the valve closing direction, a collar detachably installed in the pilot chamber, and a piston slidably inserted into the collar, the piston being configured to receive the pilot pressure on a back surface thereof and give thrust force to the spool against bias force of the bias member.

3 Claims, 6 Drawing Sheets

(51) Int. Cl.
*F15B 11/044* (2006.01)
*F16K 31/122* (2006.01)
*F15B 13/04* (2006.01)
*F15B 13/00* (2006.01)

(52) U.S. Cl.
CPC ............ *F15B 13/01* (2013.01); *F16K 31/122* (2013.01); *F15B 13/0407* (2013.01); *F15B 2013/002* (2013.01); *F15B 2211/30515* (2013.01); *F15B 2211/30525* (2013.01); *F15B 2211/329* (2013.01); *F15B 2211/355* (2013.01); *F15B 2211/41527* (2013.01); *F15B 2211/46* (2013.01); *F15B 2211/50518* (2013.01); *F15B 2211/5159* (2013.01); *F15B 2211/5756* (2013.01); *F15B 2211/761* (2013.01); *F15B 2211/8613* (2013.01); *Y10T 137/85978* (2015.04); *Y10T 137/86027* (2015.04); *Y10T 137/8671* (2015.04); *Y10T 137/87177* (2015.04)

(58) Field of Classification Search
CPC ....... Y10T 137/8671; Y10T 137/87177; Y10T 137/87209; Y10T 137/86027
See application file for complete search history.

(56) References Cited

U.S. PATENT DOCUMENTS

| | | | | |
|---|---|---|---|---|
| 6,286,534 B1* | 9/2001 | Bliss | ............... | G05D 16/166 137/102 |
| 6,289,675 B1* | 9/2001 | Herfs | ............... | F15B 11/162 60/422 |
| 6,378,302 B1* | 4/2002 | Nozawa | ............... | E02F 9/128 60/422 |
| 6,438,952 B1* | 8/2002 | Nozawa | ............... | E02F 9/2221 60/422 |
| 6,585,004 B1* | 7/2003 | Porter | ............... | F15B 11/123 137/625.64 |
| 8,006,490 B2* | 8/2011 | Kauss | ............... | F15B 11/028 60/422 |
| 8,915,075 B2* | 12/2014 | Keyl | ............... | F15B 11/003 60/422 |
| 8,973,610 B2* | 3/2015 | Ma | ............... | F15B 13/0422 137/596.14 |
| 2003/0221730 A1* | 12/2003 | Porter | ............... | F15B 11/123 137/625.64 |
| 2006/0237068 A1* | 10/2006 | Miyazoe | ............... | F15B 13/0431 137/596.16 |
| 2007/0135253 A1* | 6/2007 | Kondoh | ............... | F16H 61/0206 475/116 |
| 2010/0319337 A1* | 12/2010 | Jene | ............... | F15B 11/0445 60/459 |
| 2015/0013322 A1* | 1/2015 | Ito | ............... | F15B 11/006 60/459 |

FOREIGN PATENT DOCUMENTS

| | | |
|---|---|---|
| JP | 46-9385 B1 | 3/1971 |
| JP | H01-150265 U | 10/1989 |
| JP | H07-55031 A | 3/1995 |
| JP | H11-241779 A | 9/1999 |
| JP | 2010-101400 A | 5/2010 |

* cited by examiner

FLUID PRESSURE CONTROL DEVICE

TECHNICAL FIELD

The present invention relates to a fluid pressure control device that controls an action of hydraulic working equipment.

BACKGROUND ART

As a hydraulic control device that controls an action of hydraulic working equipment, JP2010-101400A discloses a hydraulic control device including a cylinder to be extended and contracted by working oil supplied from a pump to drive a load, a control valve that switches between supply and discharge of the working oil to and from the cylinder to control an extending/contracting action of the cylinder, and a load holding mechanism placed in a main passage that connects a load side pressure chamber of the cylinder with the control valve.

The load holding mechanism includes an operation check valve, and a meter-out control valve operated by pilot pressure to switch an action of the operation check valve.

SUMMARY OF INVENTION

In the conventional meter-out control valve, there is a need for manufacturing a spool to match a model of the hydraulic working equipment in such a manner that a change characteristic of an opening area of the spool to be changed in accordance with the pilot pressure becomes a desired characteristic in accordance with the model of the hydraulic working equipment. That is, there is a need for preparing a spool for each model of the hydraulic working equipment.

In order to manufacture a spool, there is a need for performing groove processing, thermal processing, grinding, and finishing processing. Thus, in a case where a spool is prepared for each model of the hydraulic working equipment, manufacturing cost is increased.

An object of the present invention is to reduce manufacturing cost of a hydraulic control device.

According to one aspect of the present invention, a fluid pressure control device includes: a cylinder configured to be extended and contracted by a working fluid supplied from a pump to drive a load; a control valve configured to switch between supply and discharge of the working fluid to and from the cylinder to control an extending/contracting action of the cylinder; a pilot valve configured to lead pilot pressure to the control valve; a main passage that connects a load side pressure chamber of the cylinder with the control valve, load pressure by the load acting on the load side pressure chamber in a case where the control valve is at a blocking position, and the control valve; and a load holding mechanism placed in the main passage, the load holding mechanism being configured to hold the load pressure of the load side pressure chamber in a case where the control valve is at the blocking position. The load holding mechanism includes: an operation check valve configured to allow a flow of the working fluid from the control valve to the load side pressure chamber, the operation check valve being configured to allow a flow of the working fluid from the load side pressure chamber to the control valve in accordance with pressure of a back pressure chamber to which the pressure of the load side pressure chamber is led through a throttle passage; and a switching valve configured to operate in conjunction with the control valve by the pilot pressure led through the pilot valve to switch work of the operation check valve. The switching valve includes: a pilot chamber to which the pilot pressure is led through the pilot valve; a spool that moves in accordance with the pilot pressure of the pilot chamber; a bias member that biases the spool in the valve closing direction; a collar detachably installed in the pilot chamber; and a piston slidably inserted into the collar, the piston being configured to receive the pilot pressure on a back surface thereof and give thrust force to the spool against bias force of the bias member.

DESCRIPTION OF EMBODIMENTS

With reference to the drawings, a fluid pressure control device according to an embodiment of the present invention will be described.

The fluid pressure control device is to control an action of hydraulic working equipment such as a hydraulic shovel. In the present embodiment, a case of controlling an extending/contracting action of a cylinder 2 that drives an arm (load) 1 of a hydraulic shovel shown in FIG. 1 will be described.

Figure 2:
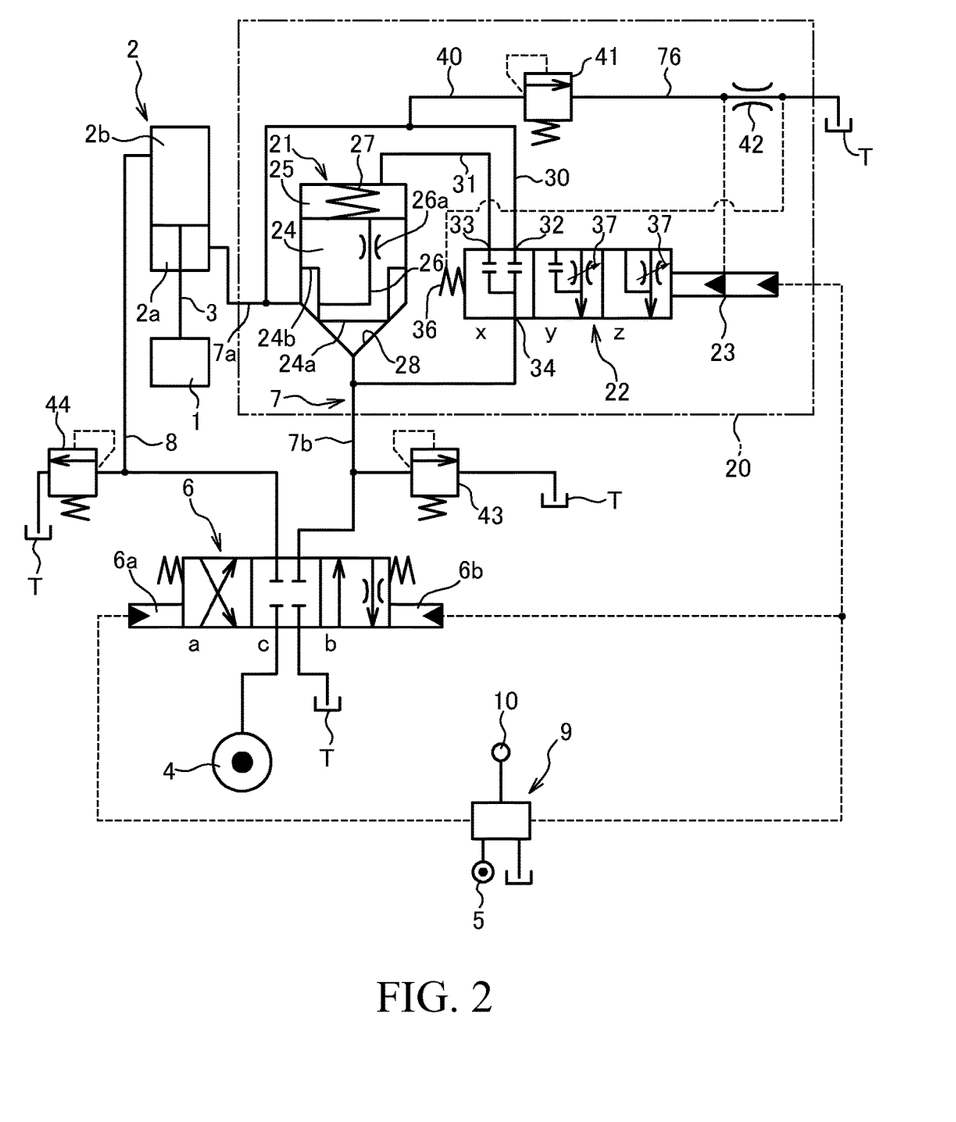
FIG. 2 is a hydraulic circuit diagram of a fluid pressure control device according to an embodiment of the present invention.

Firstly, with reference to FIG. 2, a hydraulic circuit of a hydraulic control device will be described.

The cylinder 2 is partitioned into a rod side pressure chamber 2a and a non-rod side pressure chamber 2b by a piston rod 3 that slidably moves in the cylinder 2.

An engine is installed in the hydraulic shovel, and a pump 4 and a pilot pump 5 serving as hydraulic sources are driven by power of the engine.

Working oil (working fluid) discharged from the pump 4 is supplied to the cylinder 2 through a control valve 6.

The control valve 6 and the rod side pressure chamber 2a of the cylinder 2 are connected by a first main passage 7, and the control valve 6 and the non-rod side pressure chamber 2b of the cylinder 2 are connected by a second main passage 8.

The control valve 6 is operated by pilot pressure oil supplied from the pilot pump 5 to pilot chambers 6a, 6b through a pilot valve 9 as a passenger of the hydraulic shovel manually operates an operation lever 10.

Specifically, in a case where the pilot pressure is led to the pilot chamber 6a, the control valve 6 is switched to a position a, the working oil is supplied from the pump 4 to the rod side pressure chamber 2a through the first main passage 7, and the working oil in the non-rod side pressure chamber 2b is discharged to a tank T through the second main passage 8. Thereby, the cylinder 2 performs a contracting action, and the arm 1 is raised in the direction of an arrow 80 shown in FIG. 1.

Meanwhile, in a case where the pilot pressure is led to the pilot chamber 6b, the control valve 6 is switched to a position b, the working oil is supplied from the pump 4 to the non-rod side pressure chamber 2b through the second main passage 8, and the working oil of the rod side pressure chamber 2a is discharged to the tank T through the first main passage 7. Thereby, the cylinder 2 performs an extending action, and the arm 1 is lowered in the direction of an arrow 81 shown in FIG. 1.

In a case where the pilot pressure is not led to the pilot chambers 6a, 6b, the control valve 6 is switched to a position c, supply and discharge of the working oil to and from the cylinder 2 are blocked, and the arm 1 is maintained in a stopped state.

In such a way, the control valve 6 includes three switching positions of the contracting position a at which the cylinder 2 performs the contracting action, the extending position b at which the cylinder 2 performs the extending action, and the blocking position c at which the load of the cylinder 2 is held, switches the supply and the discharge of the working oil to and from the cylinder 2, and controls the extending/contracting action of the cylinder 2.

Figure 1:
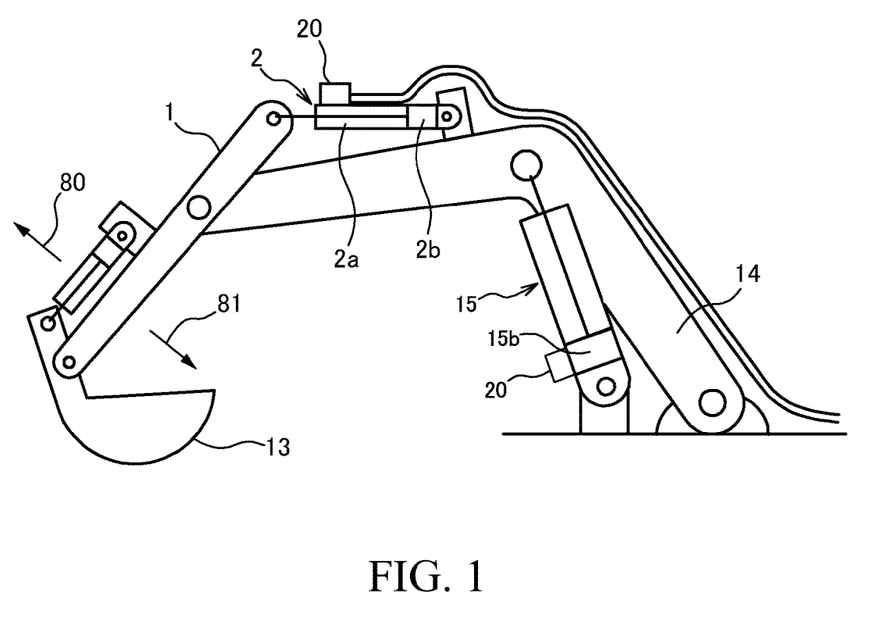
FIG. 1 is a view showing one part of a hydraulic shovel.

As shown in FIG. 1, in a case where movement of the arm 1 is stopped by switching the control valve 6 to the blocking position c in a state where a bucket 13 is brought up, force in the direction of extending acts on the cylinder 2 due to self-weight of the bucket 13, the arm 1, and the like. In such a way, in the cylinder 2 that drives the arm 1, the rod side pressure chamber 2a serves as a load side pressure chamber on which load pressure acts in a case where the control valve 6 is at the blocking position c. Lowering of the load indicates movement in the direction of contracting the load side pressure chamber, and raising of the load indicates movement in the direction of extending the load side pressure chamber.

A load holding mechanism 20 is placed in the first main passage 7 connected to the rod side pressure chamber 2a on the load side. The load holding mechanism 20 is to hold the load pressure of the rod side pressure chamber 2a in a case where the control valve 6 is at the blocking position c, and is fixed to a surface of the cylinder 2 as shown in FIG. 1.

In a cylinder 15 that drives a boom 14, a non-rod side pressure chamber 15b serves as the load side pressure chamber. Thus, in a case where a load holding mechanism 20 is provided in the boom 14, the load holding mechanism 20 is placed in a main passage connected to the non-rod side pressure chamber 15b (refer to FIG. 1).

The load holding mechanism 20 includes an operation check valve 21 placed in the first main passage 7, and a meter-out control valve 22 serving as a switching valve operated in conjunction with the control valve 6 by the pilot pressure oil supplied to a pilot chamber 23 through the pilot valve 9 to switch work of the operation check valve 21.

The operation check valve 21 includes a valve body 24 that opens and closes the first main passage 7, a seat section 28 on which the valve body 24 is seated, a back pressure chamber 25 formed on a back surface of the valve body 24, and a throttle passage 26 formed in the valve body 24, the throttle passage that always leads the working oil of the rod side pressure chamber 2a to the back pressure chamber 25. A throttle 26a is placed in the throttle passage 26.

The first main passage 7 is divided into a cylinder side first main passage 7a and a control valve side first main passage 7b by the valve body 24. The cylinder side first main passage 7a connects the rod side pressure chamber 2a and the operation check valve 21, and the control valve side first main passage 7b connects the operation check valve 21 and the control valve 6.

A first pressure receiving surface 24a on which pressure of the control valve side first main passage 7b acts, and a second pressure receiving surface 24b on which the pressure of the rod side pressure chamber 2a acts through the cylinder side first main passage 7a are formed on the valve body 24.

A spring 27 serving as a bias member that biases the valve body 24 in the valve opening direction is housed and installed in the back pressure chamber 25. In such a way, pressure of the back pressure chamber 25 and bias force of the spring 27 act in the direction of seating the valve body 24 on the seat section 28.

In a state where the valve body 24 is seated on the seat section 28, the operation check valve 21 exerts a function as a check valve that blocks a flow of the working oil from the rod side pressure chamber 2a to the control valve 6. That is, the operation check valve 21 prevents leakage of the working oil in the rod side pressure chamber 2a to hold the load pressure and to hold a stopped state of the arm 1.

The load holding mechanism 20 includes a bypass passage 30 that leads the working oil of the rod side pressure chamber 2a to the control valve side first main passage 7b while letting the working oil bypass the operation check valve 21, and a back pressure passage 31 that leads the working oil of the back pressure chamber 25 to the control valve side first main passage 7b.

The meter-out control valve 22 is placed in the bypass passage 30 and the back pressure passage 31, switches communication of the control valve side first main passage 7b with the bypass passage 30 and the back pressure passage 31 to control a flow of the working oil of the first main passage 7 on the meter-out side when the cylinder 2 performs the extending action.

The meter-out control valve 22 includes three ports of a first supply port 32 communicating with the bypass passage 30, a second supply port 33 communicating with the back pressure passage 31, and a discharge port 34 communicating with the control valve side first main passage 7b.

The meter-out control valve 22 includes three switching positions of a blocking position x, a first communication position y, and a second communication position z.

When the pilot pressure is led to the pilot chamber 6b of the control valve 6, pilot pressure of the same pressure is led to the pilot chamber 23 at the same time. That is, in a case where the control valve 6 is switched to the extending position b, the meter-out control valve 22 is also switched to the first communication position y or the second communication position z.

Specifically speaking, in a case where the pilot pressure is not led to the pilot chamber 23, the meter-out control valve 22 is maintained at the blocking position x by bias force of a spring 36. At the blocking position x, both the first supply port 32 and the second supply port 33 are blocked.

In a case where the pilot pressure less than predetermined pressure is led to the pilot chamber 23, the meter-out control valve 22 is switched to the first communication position y. At the first communication position y, the first supply port 32 communicates with the discharge port 34. Thereby, the working oil of the rod side pressure chamber 2a is led from the bypass passage 30 to the control valve side first main passage 7b through the meter-out control valve 22. That is, the working oil of the rod side pressure chamber 2a is led to the control valve side first main passage 7b while bypassing the operation check valve 21. At this time, resistance is given to the flow of the working oil by throttles 37. The second supply port 33 is maintained in a blocked state.

In a case where the pilot pressure of the predetermined pressure or more is led to the pilot chamber 23, the meter-out control valve 22 is switched to the second communication position z. At the second communication position z, the first supply port 32 communicates with the discharge port 34, and the second supply port 33 also communicates with the discharge port 34. Thereby, the working oil of the back pressure chamber 25 is led from the back pressure passage 31 to the control valve side first main passage 7*b* through the meter-out control valve 22. At this time, the working oil of the back pressure chamber 25 is led to the control valve side first main passage 7*b* while bypassing the throttles 37.

On the upstream of the meter-out control valve 22 in the bypass passage 30, a relief passage 40 is connected to branch from. A relief valve 41 to be opened in a case where the pressure of the rod side pressure chamber 2*a* reaches predetermined pressure to allow passage of the working oil and to release the working oil of the rod side pressure chamber 2*a* is placed in the relief passage 40. The working oil passing through the relief valve 41 is discharged to the tank T through a discharge passage 76. An orifice 42 is placed in the discharge passage 76, and pressure on the upstream side of the orifice 42 is led to the pilot chamber 23. The meter-out control valve 22 is set to be switched to the second communication position z by pressure of relief pressure oil led to the pilot chamber 23 through the relief valve 41.

A first main relief valve 43 is connected to the control valve side first main passage 7*b*, and a second main relief valve 44 is connected to the second main passage 8. The first main relief valve 43 and the second main relief valve 44 are to release high pressure generated in the rod side pressure chamber 2*a* and the non-rod side pressure chamber 2*b* of the cylinder 2 when large external force acts on the arm 1.

Figure 3:
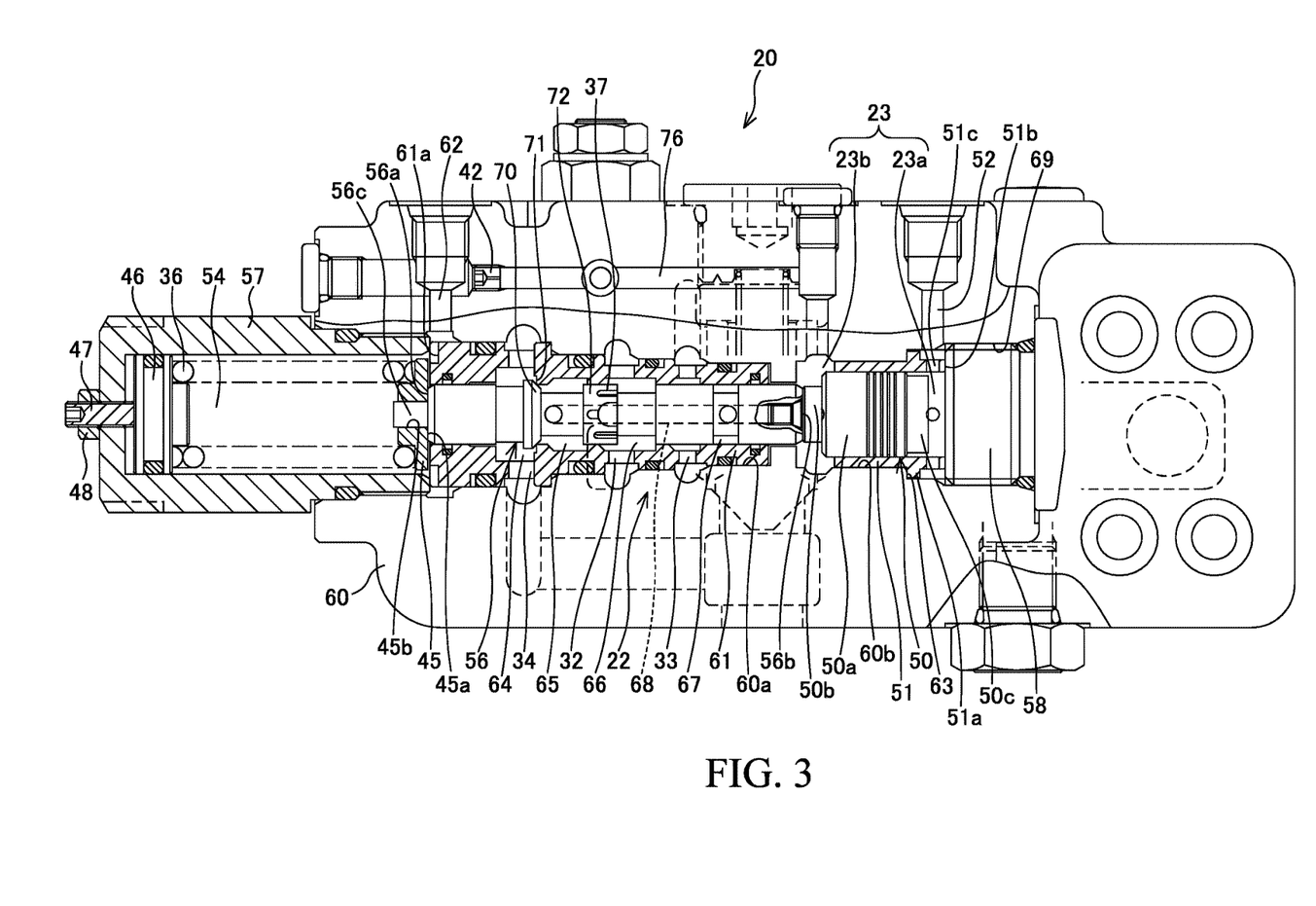
FIG. 3 is a sectional view of a load holding mechanism of the fluid pressure control device according to the embodiment of the present invention.

Next, mainly with reference to FIG. 3, the meter-out control valve 22 will be described in detail. FIG. 3 is a sectional view of the load holding mechanism 20 showing a state where the pilot pressure is not led to the pilot chamber 23 and the meter-out control valve 22 is at the blocking position x. In FIG. 3, members having the same reference signs as the reference signs shown in FIG. 2 have the same configurations as the configurations shown in FIG. 2.

The meter-out control valve 22 is assembled into a body 60. A spool hole 60*a* is formed in the body 60, and a substantially cylindrical sleeve 61 is inserted into the spool hole 60*a*. A spool 56 is slidably assembled into the sleeve 61.

A spring chamber 54 partitioned by a cap 57 is formed on the side of one end surface 56*a* of the spool 56. The spring chamber 54 communicates with the downstream side of the orifice 42 (refer to FIG. 2) through a cutout 61*a* formed on an end surface of the sleeve 61 and a passage 62 formed in the body 60, and is connected to the tank T.

The spring 36 serving as a bias member that biases the spool 56 is housed and installed in the spring chamber 54. An annular first spring receiving member 45 in which an end surface 45*a* thereof is abutted with the one end surface 56*a* of the spool 56 and a pin section 56*c* formed to project from the one end surface 56*a* of the spool 56 is inserted into a hollow section 45*b* thereof, and a second spring receiving member 46 arranged in the vicinity of a bottom part of the cap 57 are also housed and installed in the spring chamber 54. The spring 36 is placed between the first spring receiving member 45 and the second spring receiving member 46 in a compressed state, and biases the spool 56 in the valve closing direction via the first spring receiving member 45.

An axial position of the second spring receiving member 46 in the spring chamber 54 is set by abutting a front end of an adjustment bolt 47 passing through the bottom part of the cap 57 to be screwed with a back surface of the second spring receiving member 46. By screwing the adjustment bolt 47, the second spring receiving member 46 moves in the direction in which the second spring receiving member comes close to the first spring receiving member 45. Therefore, by adjusting a screwing amount of the adjustment bolt 47, an initial spring load of the spring 36 can be adjusted. The adjustment bolt 47 is fixed by a nut 48.

On the side of the other end surface 56*b* of the spool 56, the pilot chamber 23 is formed by a piston hole 60*b* formed to communicate with the spool hole 60*a* and a cap 58 that closes the piston hole 60*b*. A cylindrical collar 51 is detachably installed in the pilot chamber 23. An outer diameter of the collar 51 is the substantially same as an inner diameter of the piston hole 60*b*, and the collar 51 is installed in a state where the collar is fitted into the piston hole 60*b*. A piston 50 that receives the pilot pressure on a back surface thereof and gives thrust force against the bias force of the spring 36 to the spool 56 is slidably inserted into a hollow part of the collar 51.

The pilot chamber 23 is partitioned into a first pilot chamber 23*a* and a second pilot chamber 23*b* by the piston 50. The first pilot chamber 23*a* faces the back surface of the piston 50. The second pilot chamber 23*b* faces a front surface of the piston 50 and the other end surface 56*b* of the spool 56. The pilot pressure oil from the pilot valve 9 is supplied to the first pilot chamber 23*a* through a passage 52 formed in the body 60. The relief pressure oil passing through the relief valve 41 is led to the second pilot chamber 23*b* through the discharge passage 76.

An annular flange section 51*a* projecting in the radial direction is formed on an outer peripheral surface of the collar 51. When the collar 51 and the piston 50 are assembled into the pilot chamber 23, the cap 58 is detached, and the collar 51 is inserted along an inner peripheral surface of the piston hole 60*b* until the flange section 51*a* is abutted with a step section 63 formed in the body 60. After that, the piston 50 is inserted into the hollow part of the collar 51, and the cap 58 is fastened into a female screw hole 69 formed in the body 60. The cap 58 is screwed until a front end surface thereof is abutted with an end surface 51*b* of the collar 51. In such a way, the collar 51 is installed in the pilot chamber 23 in a state where the collar is sandwiched between the step section 63 of the body 60 and the cap 58 and axial movement thereof is restricted.

A plurality of through holes 51*c* having openings on inner and outer peripheral surfaces is formed in a trunk part of the collar 51. The pilot pressure oil supplied into the first pilot chamber 23*a* through the passage 52 flows into the hollow part of the collar 51 through the through holes 51*c*. Thereby, the pilot pressure acts on the back surface of the piston 50.

The piston 50 includes a sliding section 50*a* whose outer peripheral surface slides along an inner peripheral surface of the color 51, a front section 50*b* formed to have a smaller diameter than that of the sliding section 50*a*, and a base section 50*c* formed to have a smaller diameter than that of the sliding section 50*a*. The front section 50*b* faces the other end surface 56*b* of the spool 56. The base section 50*c* faces the front end surface of the cap 58.

When the pilot pressure oil is supplied into the first pilot chamber 23*a* through the passage 52, the pilot pressure acts on a back surface of the base section 50*c* and an annular back surface of the sliding section 50*a*. Thereby, the piston 50 goes forward and the front section 50*b* is abutted with the other end surface 56b of the spool 56, so that the spool 56 moves. In such a way, the spool 56 receives the thrust force of the piston 50 generated on the basis of the pilot pressure acting on the back surface of the piston 50, and the spool 56 moves against the bias force of the spring 36. Even in a case where the back surface of the base section 50c is abutted with the front end surface of the cap 58, the base section 50c having a smaller diameter than that of the sliding section 50a does not close the through holes 51c of the color 51, and hence the pilot pressure oil can flow into the hollow part of the collar 51 through the through holes 51c, and the pilot pressure acts on the annular back surface of the sliding section 50a.

When the relief pressure oil passing through the relief valve 41 is led into the second pilot chamber 23b through the discharge passage 76, the pressure of the relief pressure oil acts on the other end surface 56b of the spool 56. Thereby, the spool 56 moves against the bias force of the spring 36, and the meter-out control valve 22 is switched to the second communication position z. At this time, since the pressure of the relief pressure oil also acts on the piston 50, the piston 50 retreats and is abutted with the cap 58.

Figure 5:
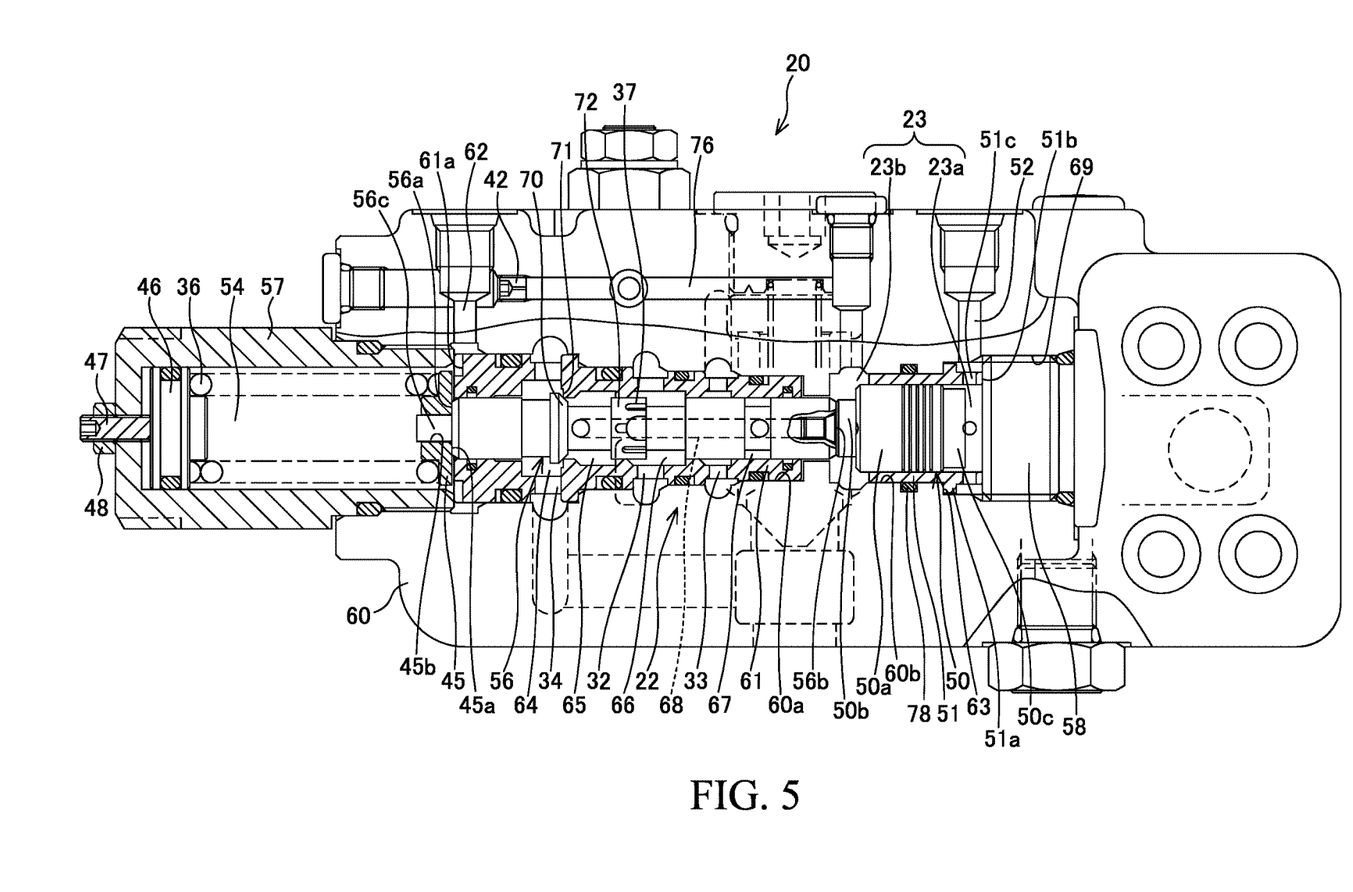
FIG. 5 is a sectional view of the load holding mechanism of the fluid pressure control device according to the embodiment of the present invention.

In order to prevent leakage of the working oil between the outer peripheral surface of the collar 51 and the inner peripheral surface of the piston hole 60b, as shown in FIG. 5, an annular groove may be formed on the inner peripheral surface of the piston hole 60b, and a seal member 78 may be provided in the annular groove.

The spool 56 stops at a position where the bias force of the spring 36 acting on the one end surface 56a and the thrust force of the piston 50 acting on the other end surface 56b are balanced. The switching position of the meter-out control valve 22 is set at the stopping position of the spool 56.

Three ports of the first supply port 32 communicating with the bypass passage 30 (refer to FIG. 2), the second supply port 33 communicating with the back pressure passage 31 (refer to FIG. 2), and the discharge port 34 communicating with the control valve side first main passage 7b are formed in the sleeve 61.

An outer peripheral surface of the spool 56 is partially cut out into an annular shape, and the cut-out parts and an inner peripheral surface of the sleeve 61 form a first pressure chamber 64, a second pressure chamber 65, a third pressure chamber 66, and a fourth pressure chamber 67.

The first pressure chamber 64 always communicates with the discharge port 34.

The third pressure chamber 66 always communicates with the first supply port 32. The plurality of throttles 37 that provides communication between the third pressure chamber 66 and the second pressure chamber 65 by moving the spool 56 against the bias force of the spring 36 is formed on an outer periphery of a land section 72 of the spool 56.

The fourth pressure chamber 67 always communicates with the second pressure chamber 65 via a pressure leading passage 68 formed in the spool 56 in the axial direction.

In a case where the pilot pressure is not led to the pilot chamber 23, a poppet valve 70 formed in the spool 56 is pressed onto a valve seat 71 formed on an inner periphery of the sleeve 61 by the bias force of the spring 36, so that communication between the second pressure chamber 65 and the first pressure chamber 64 is blocked. Therefore, communication between the first supply port 32 and the discharge port 34 is blocked. Thereby, the working oil of the rod side pressure chamber 2a is not leaked out to the discharge port 34. This state corresponds to the blocking position x of the meter-out control valve 22. In a state where the poppet valve 70 is seated on the valve seat 71 by the bias force of the spring 36, a slight gap exists between the end surface 45a of the first spring receiving member 45 and the end surface of the sleeve 61. Thus, the poppet valve 70 is reliably seated on the valve seat 71 by the bias force of the spring 36.

In a case where the pilot pressure is led to the first pilot chamber 23a and the thrust force of the piston 50 acting on the spool 56 becomes greater than the bias force of the spring 36, the spool 56 moves against the bias force of the spring 36. Thereby, the poppet valve 70 is taken away from the valve seat 71 and the third pressure chamber 66 and the second pressure chamber 65 communicate with each other through the plurality of throttles 37. Thus, the first supply port 32 communicates with the discharge port 34 through the third pressure chamber 66, the second pressure chamber 65, and the first pressure chamber 64. By the communication between the first supply port 32 and the discharge port 34, the working oil of the rod side pressure chamber 2a is led to the control valve side first main passage 7b via the throttles 37. This state corresponds to the first communication position y of the meter-out control valve 22.

When the pilot pressure led to the first pilot chamber 23a is increased, the spool 56 further moves against the bias force of the spring 36, and the fourth pressure chamber 67 communicates with the second supply port 33. Thereby, the second supply port 33 communicates with the discharge port 34 through the fourth pressure chamber 67, the pressure leading passage 68, the second pressure chamber 65, and the first pressure chamber 64. By the communication between the second supply port 33 and the discharge port 34, the working oil of the back pressure chamber 25 is led to the control valve side first main passage 7b. This state corresponds to the second communication position z of the meter-out control valve 22.

Next, actions of the hydraulic control device will be described mainly with reference to FIGS. 2 and 3.

In a case where the control valve 6 is at the blocking position c, the working oil discharged by the pump 4 is not supplied to the cylinder 2. At this time, since the pilot pressure is not led to the first pilot chamber 23a of the meter-out control valve 22, the meter-out control valve 22 is also at the blocking position x.

Therefore, the back pressure chamber 25 of the operation check valve 21 is maintained at the pressure of the rod side pressure chamber 2a. A pressure receiving area in the valve closing direction of the valve body 24 (area of the back surface of the valve body 24) is larger than an area of the second pressure receiving surface 24b serving as a pressure receiving area in the valve opening direction. Thus, by the pressure of the back pressure chamber 25 and the bias force of the spring 27, the valve body 24 is seated on the seat section 28. In such a way, by the operation check valve 21, leakage of the working oil in the rod side pressure chamber 2a is prevented and a stopped state of the arm 1 is held.

When the operation lever 10 is operated and the pilot pressure is led from the pilot valve 9 to the pilot chamber 6a of the control valve 6, the control valve 6 is switched to the contracting position a by an amount in accordance with the pilot pressure. When the control valve 6 is switched to the contracting position a, the pressure of the working oil discharged by the pump 4 acts on the first pressure receiving surface 24a of the operation check valve 21. At this time, the pilot pressure is not led to the pilot chamber 23 and the meter-out control valve 22 is at the blocking position x. Thus, the back pressure chamber 25 of the operation check valve 21 is maintained at the pressure of the rod side pressure chamber 2a. In a case where the load acting on the first pressure receiving surface 24a becomes greater than the sum of the load acting on the back surface of the valve body 24 by the pressure of the back pressure chamber 25 and the bias force of the spring 27, the valve body 24 is taken away from the seat section 28. In such a way, when the operation check valve 21 is opened, the working oil discharged from the pump 4 is supplied to the rod side pressure chamber 2a, so that the cylinder 2 is contracted. Thereby, the arm 1 is raised in the direction of the arrow 80 shown in FIG. 1.

When the operation lever 10 is operated and the pilot pressure is led from the pilot valve 9 to the pilot chamber 6b of the control valve 6, the control valve 6 is switched to the extending position b by an amount in accordance with the pilot pressure. At the same time, the pilot pressure is also led to the first pilot chamber 23a. Thus, the meter-out control valve 22 is switched to the first communication position y or the second communication position z in accordance with the supplied pilot pressure.

In a case where the pilot pressure led to the first pilot chamber 23a is less than the predetermined pressure, the meter-out control valve 22 is switched to the first communication position y. In this case, the communication between the second supply port 33 and the discharge port 34 is blocked. Thus, the back pressure chamber 25 of the operation check valve 21 is maintained at the pressure of the rod side pressure chamber 2a, and the operation check valve 21 is closed.

Meanwhile, the first supply port 32 communicates with the discharge port 34. Thus, the working oil of the rod side pressure chamber 2a is led from the bypass passage 30 to the control valve side first main passage 7b through the throttles 37, and discharged from the control valve 6 to the tank T. Since the working oil discharged by the pump 4 is supplied to the non-rod side pressure chamber 2b, the cylinder 2 is extended. Thereby, the arm 1 is lowered in the direction of the arrow 81 shown in FIG. 1.

The meter-out control valve 22 is switched to the first communication position y mainly in a case of performing a crane work to get an item to be conveyed attached to the bucket 13 down to a target position. In the crane work, there is a need for letting the cylinder 2 perform the extending action at low speed to slowly lower the arm 1 in the direction of the arrow 81. Thus, the control valve 6 is only switched to the extending position b to a slight extent. Therefore, the pilot pressure led to the pilot chamber 6b of the control valve 6 is small, the pilot pressure led to the first pilot chamber 23a of the meter-out control valve 22 is less than the predetermined pressure, and the meter-out control valve 22 is switched only to the first communication position y. Consequently, the working oil of the rod side pressure chamber 2a is discharged through the throttles 37, so that the arm 1 is lowered at low speed suitable for the crane work.

In a case where the meter-out control valve 22 is at the first communication position y and even when a situation where the working oil is leaked out to an exterior due to burst of the control valve side first main passage 7b or the like is generated, a flow rate of the working oil discharged from the rod side pressure chamber 2a is restricted by the throttles 37. Thus, falling speed of the bucket 13 is not increased. This function is called as metering control. Therefore, before the bucket 13 falls down to the ground, the meter-out control valve 22 can be switched to the blocking position x, so that fall of the bucket 13 can be prevented.

In such a way, the throttles 37 are to suppress lowering speed of the cylinder 2 at the time of closing the operation check valve 21 and also to suppress the falling speed of the bucket 13 at the time of the burst of the control valve side first main passage 7b.

In a case where the pilot pressure led to the first pilot chamber 23a is the predetermined pressure or more, the meter-out control valve 22 is switched to the second communication position z. In this case, the second supply port 33 communicates with the discharge port 34. Thus, the working oil of the back pressure chamber 25 of the operation check valve 21 is led from the back pressure passage 31 to the control valve side first main passage 7b, and discharged from the control valve 6 to the tank T. Thereby, differential pressure is generated before and after the throttle passage 26, and the pressure in the back pressure chamber 25 is reduced. Thus, force in the valve closing direction acting on the valve body 24 is reduced, the valve body 24 is taken away from the seat section 28, and the function of the operation check valve 21 as the check valve is canceled.

In such a way, the operation check valve 21 is activated to allow a flow of the working oil from the control valve 6 to the rod side pressure chamber 2a, and to allow a flow of the working oil from the rod side pressure chamber 2a to the control valve 6 in accordance with the pressure of the back pressure chamber 25.

When the operation check valve 21 is opened, the working oil of the rod side pressure chamber 2a is discharged to the tank T through the first main passage 7. Thus, the cylinder 2 is quickly extended. That is, when the meter-out control valve 22 is switched to the second communication position z, a flow rate of the working oil discharged from the rod side pressure chamber 2a is increased. Thus, a flow rate of the working oil supplied to the non-rod side pressure chamber 2b is increased and extending speed of the cylinder 2 is increased. Thereby, the arm 1 is quickly lowered in the direction of the arrow 81.

The meter-out control valve 22 is switched to the second communication position z in a case of performing an excavating work or the like, and the control valve 6 is switched to the extending position b to a great extent. Therefore, the pilot pressure led to the pilot chamber 6b of the control valve 6 is great, the pilot pressure led to the first pilot chamber 23a of the meter-out control valve 22 becomes the predetermined pressure or more, and the meter-out control valve 22 is switched to the second communication position z.

Next, actions and effects of the present embodiment will be described mainly with reference to FIG. 3.

The spool 56 moves against the bias force of the spring 36 in accordance with the pilot pressure of the first pilot chamber 23a, and an opening area thereof is changed. A change characteristic of the opening area of the spool 56 to be changed in accordance with the pilot pressure of the first pilot chamber 23a (hereinafter, simply referred to as the "opening area change characteristic of the spool 56") is different in accordance with size and a model of a hydraulic shovel. In order to make the opening area change characteristic of the spool 56 a desired characteristic in accordance with the size and the model of the hydraulic shovel, there is a need for adjusting a shape of the spool and a pressure receiving diameter of the piston in a conventional example. At the time, there is a need for manufacturing the body 60 to match the shape of the spool and the pressure receiving diameter of the piston.

However, in the present embodiment, the collar 51 is detachably installed in the pilot chamber 23. Thus, by using a collar 51 having a different inner diameter, an outer diameter of the piston 50 which is a pressure receiving area on which the pilot pressure acts can be freely set. That is, by using a collar 51 having a different inner diameter, the thrust force of the piston 50 given to the spool 56 can be freely set. Therefore, by not changing the spool 56 and the body 60 but only replacing just the collar 51 and the piston 50, the opening area change characteristic of the spool 56 can be freely set. Consequently, irrespective of the size and the model of the hydraulic shovel, the spool 56, the sleeve 61, and the body 60 can be shared. Thus, manufacturing cost of the hydraulic control device can be reduced.

In order to manufacture the spool 56, there is a need for performing groove processing, thermal processing, grinding, and finishing processing. Thus, a lead time required of manufacturing of the spool 56 is long. Therefore, in the method of adjusting the opening area change characteristic of the spool 56 by the shape of the spool 56, there is a need for carrying stocks of the spool 56 for each size and each model of the hydraulic shovel in order to handle a short delivery time. However, in the present embodiment, the spool 56 can be shared irrespective of the size and the model of the hydraulic shovel. Thus, there is an advantage of no need for carrying stocks of the spool 56.

Figure 4:
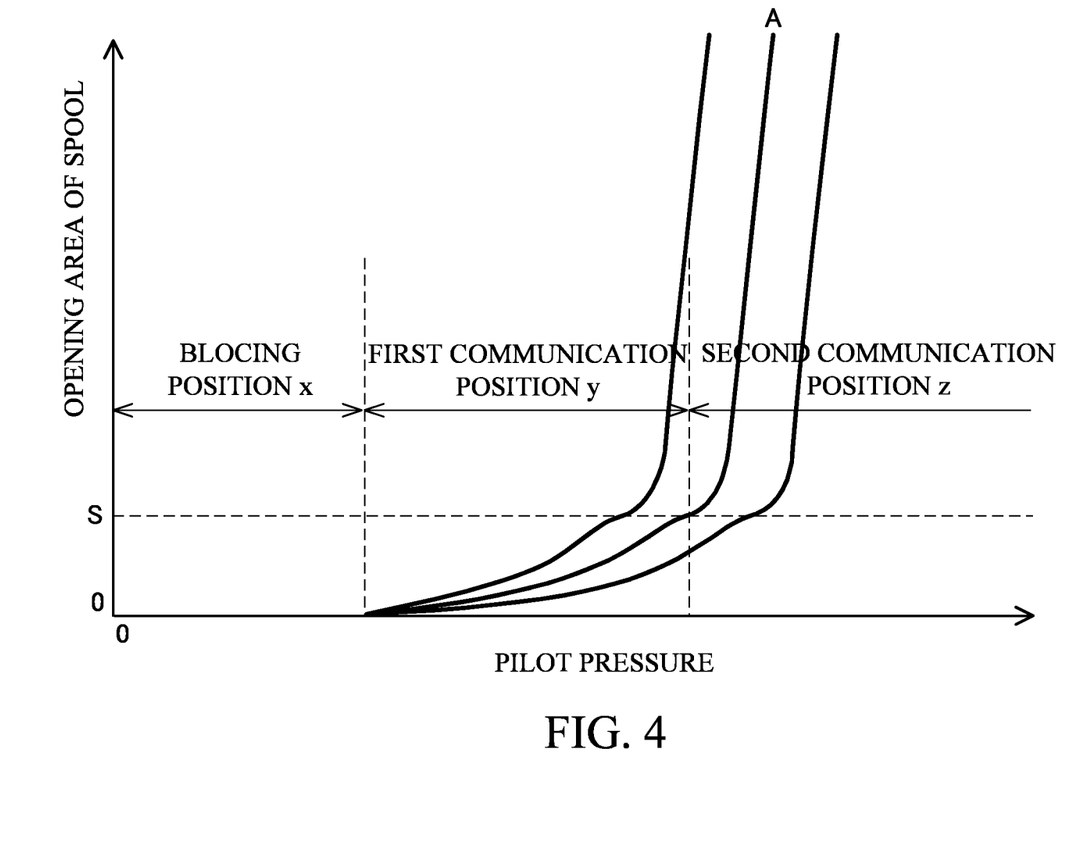
FIG. 4 is a graph showing a change characteristic of an opening area of a spool to be changed in accordance with pilot pressure.

FIG. 4 is a graph showing the opening area change characteristic of the spool 56, in which the horizontal axis indicates the pilot pressure of the first pilot chamber 23*a*, and the vertical axis indicates the opening area of the spool 56. Since the thrust force of the piston 50 given to the spool 56 can be freely set, an inclination of a change in the opening area of the spool 56 with respect to the pilot pressure of the first pilot chamber 23*a* can be freely set as shown in FIG. 4. Therefore, it is possible to respond to various models of hydraulic shovels. With a characteristic A in FIG. 4, a range of the pilot pressure with the opening area of the spool 56 of zero corresponds to the blocking position x, a range of the pilot pressure with the opening area greater than zero and not greater than S corresponds to the first communication position y, and a range of the pilot pressure with the opening area exceeding S corresponds to the second communication position z.

When the control valve 6 is set at the blocking position c and the movement of the arm 1 is stopped, and in a case where large external force is added to the arm 1 and the pressure of the rod side pressure chamber 2*a* of the cylinder 2 is increased and reaches the predetermined pressure, the relief valve 41 performs an opening action. The relief pressure oil passing through the relief valve 41 is led to the second pilot chamber 23*b*. Thus, the spool 56 moves against the bias force of the spring 36. At this time, in a case where the meter-out control valve 22 is switched only to the first communication position y, the spool 56 is oscillated by pressure pulsation of the relief valve 41, and a flow of the working oil passing through the meter-out control valve 22 also pulsates, so that a body of the hydraulic shovel is vibrated. However, in the present embodiment, the meter-out control valve 22 is set to be switched to the second communication position z by the pressure of the relief pressure oil passing through the relief valve 41. Specifically, a spring constant or an initial spring load of the spring 36 is set to be small in such a manner that the spool 56 moves to the second communication position z by the pressure of the relief pressure oil passing through the relief valve 41.

Since the meter-out control valve 22 is switched to the second communication position z by the pressure of the relief pressure oil passing through the relief valve 41, at the time of performing the opening action by the relief valve 41, the operation check valve 21 is opened. Thus, in comparison to the opening area of the spool 56, an opening area of the operation check valve 21 becomes sufficiently large, and a main flow of the working oil discharged from the rod side pressure chamber 2*a* passes through the operation check valve 21. Therefore, even when the spool 56 is oscillated by the pressure pulsation of the relief valve 41, the pulsation of the flow of the working oil passing through the meter-out control valve 22 is suppressed, and the vibration of the body of the hydraulic shovel is also suppressed.

In such a way, by setting the spring constant or the initial spring load of the spring 36 to be small, the vibration of the body of the hydraulic shovel can be suppressed. In a case where the spring constant or the initial spring load of the spring 36 is set to be small, the opening area change characteristic of the spool 56 is changed. However, according to the present embodiment, by replacing only the collar 51 and the piston 50, adjustment can be made so that the opening area change characteristic of the spool 56 is not changed. In such a way, as a result of free setting of the thrust force of the piston 50 given to the spool 56, the vibration of the body of the hydraulic shovel can be suppressed by setting the spring constant or the initial spring load of the spring 36 to be small.

As a result of switching of the meter-out control valve 22 to the second communication position z by the pressure of the relief pressure oil passing through the relief valve 41, there is also an effect that surge pressure at the time of opening the relief valve 41 is easily released as an opening area of the second communication position z is larger than that of the first communication position y.

Embodiments of this invention were described above, but the above embodiments are merely examples of applications of this invention, and the technical scope of this invention is not limited to the specific constitutions of the above embodiments.

Figure 6:
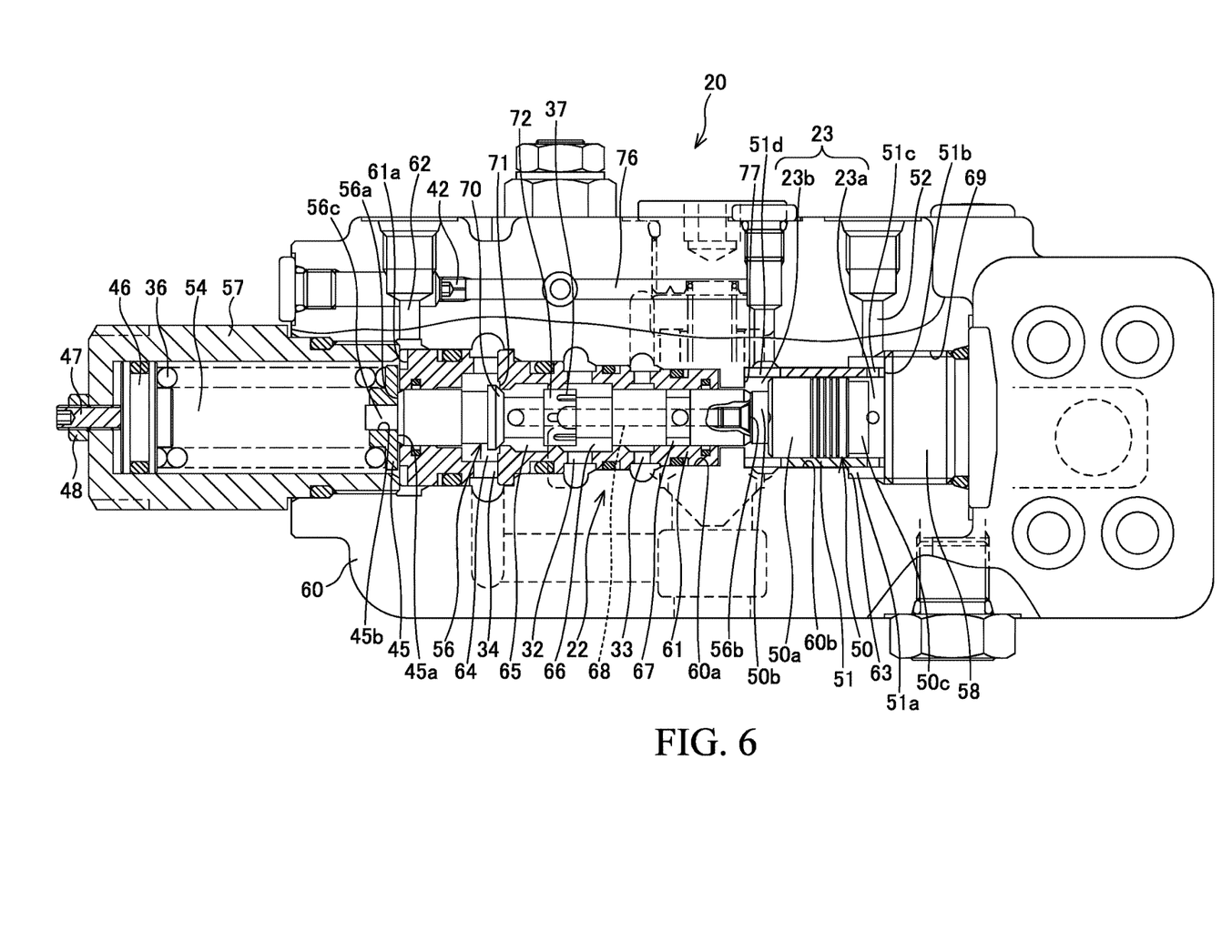
FIG. 6 is a sectional view of the load holding mechanism of the fluid pressure control device according to the embodiment of the present invention.

For example, in the above embodiment, the collar 51 has a configuration that the flange section 51*a* is sandwiched and fixed by the step section 63 of the body 60 and the cap 58. In place of this configuration, as shown in FIG. 6, the flange section 51*a* may be not provided on the outer peripheral surface of the collar 51, and both ends of the collar 51 may be sandwiched and fixed by a step section 77 formed in the body 60 and the cap 58. In this case, there is a need for forming an oil path 51*d* for leading the relief pressure oil passing through the relief valve 41 to the second pilot chamber 23*b* in the trunk part of the collar 51.

This application claims priority based on Japanese Patent Application No. 2013-011386 filed with the Japan Patent Office on Jan. 24, 2013, the entire contents of which are incorporated into this specification.

The invention claimed is:

1. A fluid pressure control device, comprising:
    a cylinder configured to be extended and contracted by a working fluid supplied from a pump to drive a load;
    a control valve configured to switch between supply and discharge of the working fluid to and from the cylinder to control an extending/contracting action of the cylinder;
    a pilot valve configured to apply pilot pressure to the control valve;
    a main passage that connects a load side pressure chamber of the cylinder with the control valve, load pressure by the load acting on the load side pressure chamber in a case where the control valve is at a blocking position, and the control valve; and
    a load holding mechanism placed in the main passage, the load holding mechanism being configured to hold the load pressure of the load side pressure chamber in a case where the control valve is at the blocking position, wherein the load holding mechanism includes:
an operation check valve configured to allow a flow of the working fluid from the control valve to the load side pressure chamber, the operation check valve being configured to allow a flow of the working fluid from the load side pressure chamber to the control valve in accordance with pressure of a back pressure chamber to which the pressure of the load side pressure chamber is led through a throttle passage;
a switching valve configured to operate in conjunction with the control valve by the pilot pressure led through the pilot valve to switch work of the operation check valve; and
a relief valve configured to open in a case where the pressure of the load side pressure chamber reaches predetermined pressure to allow passage of the working fluid and release the working fluid of the load side pressure chamber,
wherein the switching valve includes:
a body;
a first pilot chamber to which pilot pressure fluid having the pilot pressure is led through the pilot valve;
a cap fastened in the body and defining an end of the first pilot chamber;
a spool that moves in accordance with the pilot pressure of the pilot pressure fluid in the first pilot chamber;
a bias member that biases the spool in the valve closing direction;
a collar detachably installed in the first pilot chamber, the collar having a collar passage;
a piston slidably inserted into the collar, the piston being configured to receive the pilot pressure from the pilot pressure fluid led through the collar passage on a back surface thereof and give thrust force to the spool against bias force of the bias member; and
a second pilot chamber formed between the piston and the spool, relief pressure fluid passing through the relief valve being led to the second pilot chamber,
wherein the collar includes an annular flange section formed on an outer peripheral surface thereof, the flange section being abutted with a step section formed in the body, the collar being sandwiched between the step section of the body and the cap to restrict axial movement thereof,
wherein a gap is formed between an end surface of the collar opposite from the cap and the body, the relief pressure fluid being led to the second pilot chamber through the gap,
wherein the switching valve is switched to a first communication position or a second communication position in accordance with the pilot pressure, the working fluid of the load side pressure chamber being led to the main passage while bypassing the operation check valve at the first communication position, the working fluid of the back pressure chamber in the operation check valve being led to the main passage at the second communication position, and
wherein a switching of the switching valve to the first communication position or the second communication position in accordance with the pilot pressure is set by replacing the collar and the piston.

2. The fluid pressure control device according to claim 1, further comprising:
a bypass passage that leads the working fluid of the load side pressure chamber to the main passage while letting the working fluid bypass the operation check valve; and
a back pressure passage that leads the working fluid of the back pressure chamber to the main passage,
wherein the switching valve is placed in the bypass passage and the back pressure passage, and
the switching valve is set such that the spool moves to a communication position where the back pressure passage and the main passage communicate with each other against the bias force of the bias member by the pressure of the working fluid led to the second pilot chamber through the relief valve.

3. A fluid pressure control device, comprising:
a cylinder configured to be extended and contracted by a working fluid supplied from a pump to drive a load;
a control valve configured to switch between supply and discharge of the working fluid to and from the cylinder to control an extending/contracting action of the cylinder;
a pilot valve configured to lead pilot pressure fluid having a pilot pressure to the control valve;
a main passage that connects a load side pressure chamber of the cylinder with the control valve, load pressure by the load acting on the load side pressure chamber in a case where the control valve is at a blocking position, and the control valve; and
a load holding mechanism placed in the main passage, the load holding mechanism being configured to hold the load pressure of the load side pressure chamber in a case where the control valve is at the blocking position,
wherein the load holding mechanism includes:
an operation check valve configured to allow a flow of the working fluid from the control valve to the load side pressure chamber, the operation check valve being configured to allow a flow of the working fluid from the load side pressure chamber to the control valve in accordance with the pressure of a back pressure chamber to which the pressure of the load side pressure chamber is led through a throttle passage;
a switching valve configured to operate in conjunction with the control valve by the pilot pressure led through the pilot valve to switch work of the operation check valve; and
a relief valve configured to open in a case where the pressure of the load side pressure chamber reaches predetermined pressure to allow passage of the working fluid and release the working fluid of the load side pressure chamber,
wherein the switching valve includes:
a body;
a first pilot chamber to which the pilot pressure fluid having the pilot pressure is led through the pilot valve;
a cap fastened in the body and defining an end of the first pilot chamber;
a spool that moves in accordance with the pilot pressure of the pilot pressure fluid in the first pilot chamber;
a bias member that biases the spool in the valve closing direction;
a collar detachably installed in the first pilot chamber, the collar having a collar passage through the collar;
a piston slidably inserted into the collar, the piston being configured to receive the pilot pressure of the pilot pressure fluid led through the collar passage on a back surface thereof and give thrust force to the spool against bias force of the bias member; and a second pilot chamber formed between the piston and the spool, relief pressure fluid passing through the relief valve being led to the second pilot chamber, wherein opposite ends of the collar are sandwiched between the body and the cap, respectively, to restrict axial movement thereof, the collar defining a path for leading the relief pressure fluid passing through the relief valve to the second pilot chamber, wherein the switching valve is switched to a first communication position or a second communication position in accordance with the pilot pressure, the working fluid of the load side pressure chamber being led to the main passage while bypassing the operation check valve at the first communication position, the working fluid of the back pressure chamber in the operation check valve being led to the main passage at the second communication position, and wherein a switching of the switching valve to the first communication position or the second communication position in accordance with the pilot pressure is set by replacing the collar and the piston.

\* \* \* \* \*